(12) United States Patent
Keskin et al.

(10) Patent No.: US 9,380,224 B2
(45) Date of Patent: Jun. 28, 2016

(54) DEPTH SENSING USING AN INFRARED CAMERA

(71) Applicant: Microsoft Corporation, Redmond, WA (US)

(72) Inventors: Cem Keskin, Cambridge (GB); Sean Ryan Francesco Fanello, Genoa (IT); Shahram Izadi, Cambridge (GB); Pushmeet Kohli, Cambridge (GB); David Kim, Cambridge (GB); David Sweeney, Cambridge (GB); Jamie Daniel Joseph Shotton, Cambridge (GB); Duncan Paul Robertson, Cambridge (GB); Sing Bing Kang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/193,686

(22) Filed: Feb. 28, 2014

(65) Prior Publication Data

US 2015/0248764 A1 Sep. 3, 2015

(51) Int. Cl.
| | |
|---|---|
| *G06K 9/00* | (2006.01) |
| *H04N 5/33* | (2006.01) |
| *G06T 7/00* | (2006.01) |
| *G06K 9/20* | (2006.01) |
| *G06K 9/62* | (2006.01) |

(52) U.S. Cl.
CPC .............. *H04N 5/33* (2013.01); *G06K 9/00201* (2013.01); *G06K 9/2018* (2013.01); *G06K 9/6219* (2013.01); *G06K 9/6282* (2013.01); *G06T 7/0057* (2013.01); *G06T 2200/04* (2013.01); *G06T 2207/10028* (2013.01); *G06T 2207/10048* (2013.01); *G06T 2207/20081* (2013.01); *G06T 2207/30201* (2013.01)

(58) Field of Classification Search
CPC ................................. H04N 5/33; G06T 7/0051
USPC ......................................................... 382/106
See application file for complete search history.

(56) References Cited

U.S. PATENT DOCUMENTS

| | | | |
|---|---|---|---|
| 6,862,564 B1 * | 3/2005 | Shue et al. ....................... 703/25 |
| 8,872,111 B2 * | 10/2014 | Burkland ................... 250/338.1 |
| 2004/0101043 A1 * | 5/2004 | Flack et al. ............. 375/240.01 |
| 2009/0086046 A1 * | 4/2009 | Reilly et al. ............... 348/222.1 |
| 2012/0280897 A1 * | 11/2012 | Balan et al. .................... 345/156 |
| 2012/0287401 A1 * | 11/2012 | Bizios .................. A61B 3/0025 351/206 |
| 2013/0342527 A1 * | 12/2013 | Molyneaux et al. .......... 345/419 |
| 2014/0104387 A1 * | 4/2014 | Klusza et al. ................... 348/46 |
| 2014/0122381 A1 * | 5/2014 | Nowozin ........................ 706/12 |
| 2014/0172753 A1 * | 6/2014 | Nowozin et al. ................ 706/12 |
| 2015/0058337 A1 * | 2/2015 | Gordon et al. ................ 707/736 |

(Continued)

FOREIGN PATENT DOCUMENTS

EP 2701138 A1 * 2/2014 ............. G09B 21/00

*Primary Examiner* — Gregory F Cunningham
(74) *Attorney, Agent, or Firm* — Tom Wong; Micky Minhas; Zete Law, P.L.L.C.

(57) ABSTRACT

A method of sensing depth using an infrared camera. In an example method, an infrared image of a scene is received from an infrared camera. The infrared image is applied to a trained machine learning component which uses the intensity of image elements to assign all or some of the image elements a depth value which represents the distance between the surface depicted by the image element and the infrared camera. In various examples, the machine line component comprises one or more random decision forests.

20 Claims, 14 Drawing Sheets

(56) References Cited

U.S. PATENT DOCUMENTS

| | | | |
|---|---|---|---|
| 2015/0062558 A1* | 3/2015 | Koppal et al. | 356/5.01 |
| 2015/0123901 A1* | 5/2015 | Schwesinger et al. | 345/158 |
| 2015/0145985 A1* | 5/2015 | Gourlay et al. | 348/135 |
| 2015/0169169 A1* | 6/2015 | Andersson | |
| 2015/0181099 A1* | 6/2015 | Van Der Tempel et al. | |

* cited by examiner

DEPTH SENSING USING AN INFRARED CAMERA

BACKGROUND

Knowledge of the depth of an element is becoming more important in areas such as gaming, three dimensional (3D) scanning and fabrication, augmented reality and robotics, with particular importance in natural users interfaces. Specifically, the ability to reason about the 3D geometry of a scene makes the sensing of whole bodies, hands, and faces more tractable allowing these modalities to be leveraged for high degree-of freedom input.

Previous approaches to obtaining depth information have used a specialized depth camera. While depth cameras are becoming more of a commodity they have yet to surpass the ubiquity of regular two-dimensional (2D) cameras, now found in the majority of mobile devices and desktop workspaces. More widespread adoption of depth cameras is limited by considerations including power, cost and form-factor. So, despite recent advances in miniaturizing depth cameras, the need for custom sensors, high-power illumination, complex electronics and other physical constraints will often limit scenarios of use, particularly when compared to regular cameras. Accordingly, there is a need for a more cost effective way to obtain depth information.

The embodiments described below are not limited to implementations which solve any or all of the disadvantages of known depth sensing systems.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

A method of sensing depth using an infrared camera is described. In an example method, an infrared image of a scene is received from an infrared camera. The infrared image is applied to a trained machine learning component which uses the intensity of image elements to assign all or some of the image elements a depth value which represents the distance between the surface depicted by the image element and the infrared camera. In various examples, the machine learning component comprises one or more random decision forests.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Described herein are systems and methods for obtaining depth information for a scene using a simple infrared (IR) camera. The system implements machine learning to correlate the intensity of an image element (and that of its neighbors) and its three-dimensional (3D) depth. The IR camera may be a specialized IR camera or may be a modified conventional, monocular camera. Such a system allows depth information to be obtained in a very cost-effective and efficient manner allowing it to be implemented in low cost and low power devices such as mobile phones.

Although the present examples are described and illustrated herein as being implemented in an office or workspace image analysis system, the system described is provided as an example and not a limitation. As those skilled in the art will appreciate, the present examples are suitable for application in a variety of different types of image analysis systems.

Figure 1:
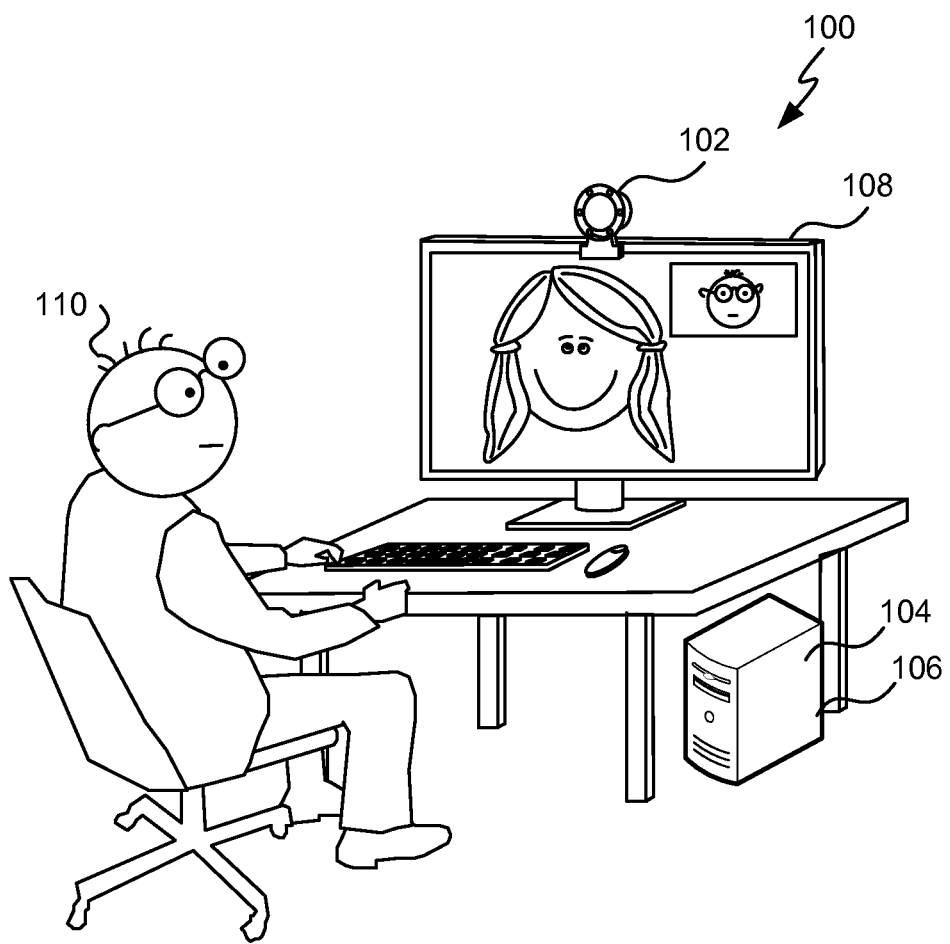
FIG. 1 is a schematic diagram of a depth sensing system.

Reference is now made to FIG. 1, which illustrates an example depth sensing system 100. In this example, the system 100 comprises an IR camera 102 arranged to capture one or more IR images of a scene comprising one or more surfaces; and a computing-based device 104 in communication with the IR camera 102 configured to generate depth maps from the IR images without input from a depth camera. In some cases the system 100 may generate one depth map for each IR image generated by the IR camera 102. In other cases the system 100 may combine information from multiple IR images to generate a single depth map; interpolate between successive IR images to generate multiple depth maps; and/or combine IR images from multiple IR cameras to produce a single depth map.

In FIG. 1, the IR camera 102 is mounted on a display screen 108 above and pointing horizontally at the scene including the user 110. However, in other examples, the IR camera 102 may be embedded within or mounted on any other suitable object in the environment (e.g. within display screen 108 or computing-based device 104).

The computing-based device 104 shown in FIG. 1 is a traditional desktop computer with a separate processor component 106 and display screen 108, however, the methods and systems described herein may equally be applied to computing-based devices 102 wherein the processor component 106 and display screen 108 are integrated such as in a laptop computer, tablet computer or smart phone. Traditionally it has been difficult to integrate depth sensing equipment and/or software within such integrated devices due to the power and form factor constraints on traditional depth cameras.

Although the scene of FIG. 1 comprises a person 110 at a desk, a person of skill in the art will appreciate that the methods and systems described herein may be equally applied to other scenes.

Figure 2:
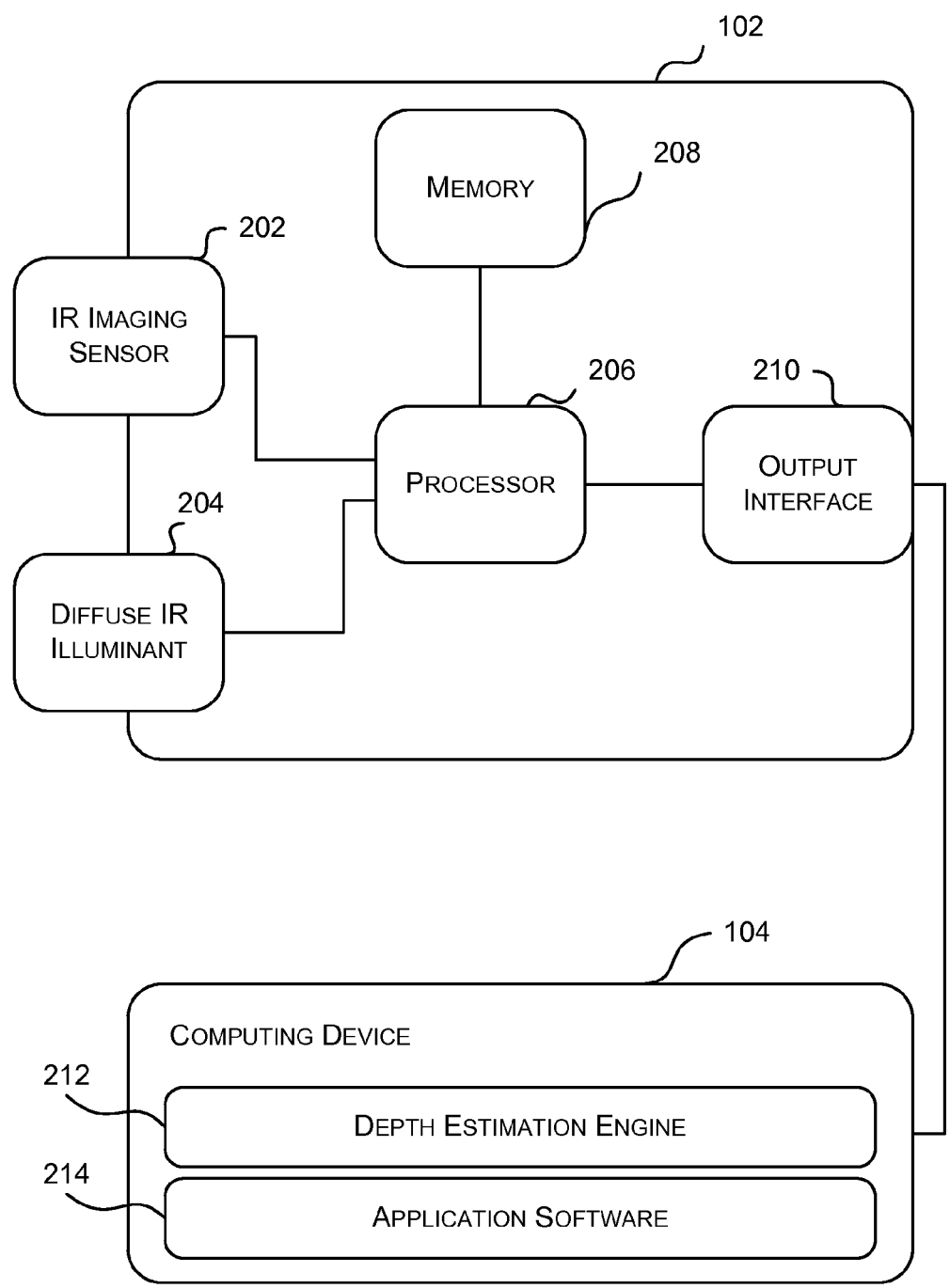
FIG. 2 is a schematic diagram of the IR camera and computing-based device of FIG. 1.

Reference is now made to FIG. 2, which illustrates a schematic diagram of an IR camera 102 that may be used in the system 100 of FIG. 1.

The IR camera 102 comprises at least one IR imaging sensor 202 for capturing IR images of the scene 104 and a diffuse IR illuminant 204 arranged to actively illuminate the scene. As described in more detail below, in some cases the diffuse IR illuminate comprises multiple (e.g. 6) IR light emitting diodes (LED) around the IR imaging sensor 202. This reduces shadowing with a minimal baseline and improves lighting uniformity. In some cases, the IR illuminant 204 may be pulsed so that differences between successive images may be used to remove ambient illumination.

The IR camera 102 may also comprise at least one processor 206, which is in communication with the IR imaging sensor 202 and the IR illuminant 204. The processor 206 may be a general purpose microprocessor or a specialized signal/image processor. The processor 206 is arranged to execute instructions to control the IR imaging sensor 202 and IR illuminant 204 to capture IR images. The processor 206 may optionally be arranged to perform processing on these images and signals, as outlined in more detail below.

The IR camera 102 may also include memory 208 arranged to store the instructions for execution by the processor 206, images or frames captured by the IR camera 202, or any suitable information, images or the like. In some examples, the memory 208 can include random access memory (RAM), read only memory (ROM), cache, Flash memory, a hard disk, or any other suitable storage component. The memory 208 can be a separate component in communication with the processor 206 or integrated into the processor 206.

The IR camera 102 may also include an output interface 210 in communication with the processor 206. The output interface 210 is arranged to provide the image data to the computing-based device 104 via a communication link. The communication link can be, for example, a wired connection (e.g. USB™, Firewire™, Ethernet™ or similar) and/or a wireless connection (e.g. WiFi™, Bluetooth™ or similar). In other examples, the output interface 210 can interface with one or more communication networks (e.g. the Internet) and provide data to the computing-based device 104 via these networks.

The computing-based device 104 may comprise a depth estimation engine 212 that is configured to generate a depth map from the image data received from the IR camera 102. The depth map is generated from a trained machine learning component that has been trained to map the intensity of an image element (and surrounding image elements) to a depth value.

The depth map comprises, for each image element of the IR image, a depth value that represents the absolute distance between the surface in the scene depicted by the individual image element and the IR camera 102. An image element is a unit of an image such as a pixel, a voxel, a group of pixels or voxels. An example method which may be used by the depth estimation engine 212 for generating the depth map will be described with reference to FIG. 8.

Application software 214 may also be executed on the computing-based device 108 which may use the output of the depth estimation engine 212 (e.g. depth map). For example, the computing-based device 104 may comprise a gesture recognition engine which uses the depth map to identify gestures performed by the user which then may be used to control the operation of the computing-based device.

Figure 3:
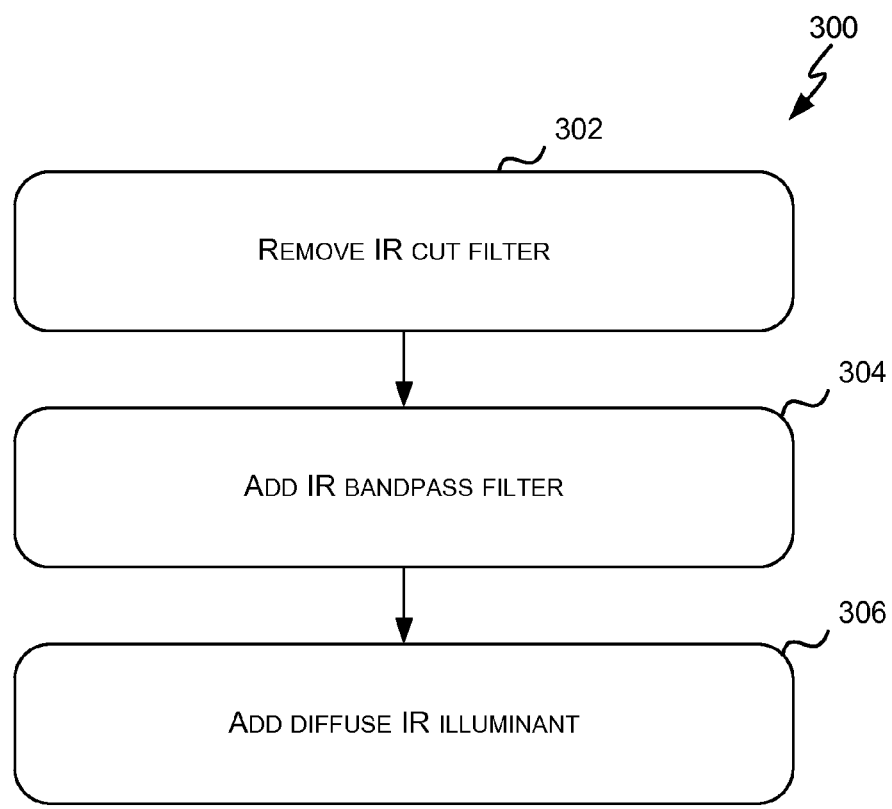
FIG. 3 is a flow chart of a method of converting an RGB camera into an IR camera.

As described above, the IR camera 102 may be a dedicated IR camera or it may be a regular commodity camera, such as an RGB camera, that has been modified to allow it to operate as an IR camera. Reference is now made to FIG. 3 which illustrates an example method 300 for modifying a regular commodity camera, such as an RGB camera, to operate as an IR camera. At block 302, the IR cut filter that is typically present is removed. Once the IR cut filter is removed, the method 300 proceeds to block 304.

At block 304, an IR bandpass filter is added. This turns the regular commodity camera into an IR camera (i.e. a camera capable of generating IR images of a scene). Once the IR bandpass filter is added, the method 300 proceeds to block 306.

At block 306, a diffuse IR illuminant is added to illuminate the scene. In some cases a ring of LEDs are built around the camera lens. Since a typical LED has a limited beam angle with significant attenuation away from its main optical direction, a ring of LEDs reduces shadowing and improves uniformity of lighting. The modified camera 102 of FIG. 1 comprises six diffuse IR LEDs, however, any suitable number of LEDs or other diffuse IR illuminants may be used. Once the diffuse IR illuminant is added, the method 300 ends.

This conversion method produces an extremely inexpensive depth camera as compared to stereo, structured light of time of flight (ToF) cameras. It also allows the IR camera to have a very small form factor which allows it to be embedded into relatively small devices, such as mobile phones.

Figure 4:
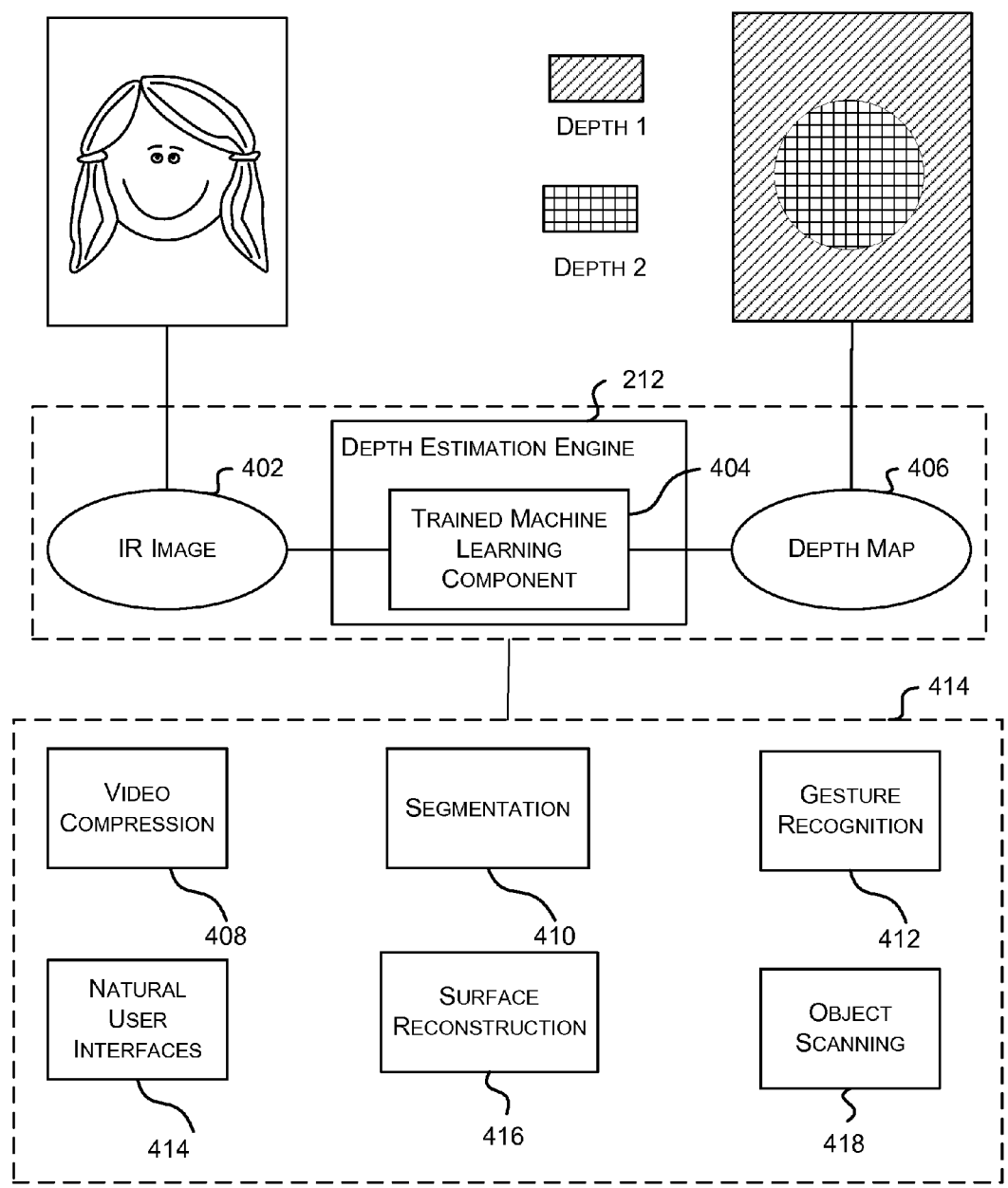
FIG. 4 is a schematic diagram of the depth estimation engine of FIG. 2.

Reference is now made to FIG. 4 which is a schematic diagram of the depth estimation engine 212 of FIG. 2. As described above, the depth estimation engine 212 receives an IR image 402 and applies it to a trained machine learning component 404 to produce a depth map 406. In some examples the trained machine learning component may comprise one or more random decision forests. In other examples, other suitable machine learning components may be used such as, but not limited to, a deep neural network, a support vector regressor, and a Gaussian process regressor. As described above the depth map comprises a depth value for each image element of the IR image 402. The depth value represents the absolute distance between the surface represented by the image element in the image and the IR camera 102.

The depth estimation engine 212 of FIG. 2 may be integral with, or in communication with functionality that uses the depth image. For example, any of a video compression 408, segmentation 410 (e.g. for background removal); gesture recognition (e.g. to identify gestures performed by the user); natural user interface 414 (e.g. to control the operation of a computer in conjunction with for example gesture recognition), surface reconstruction 416 and object scanning 418 may be configured to use the depth map generated by the depth estimation engine 212.

Figure 5:
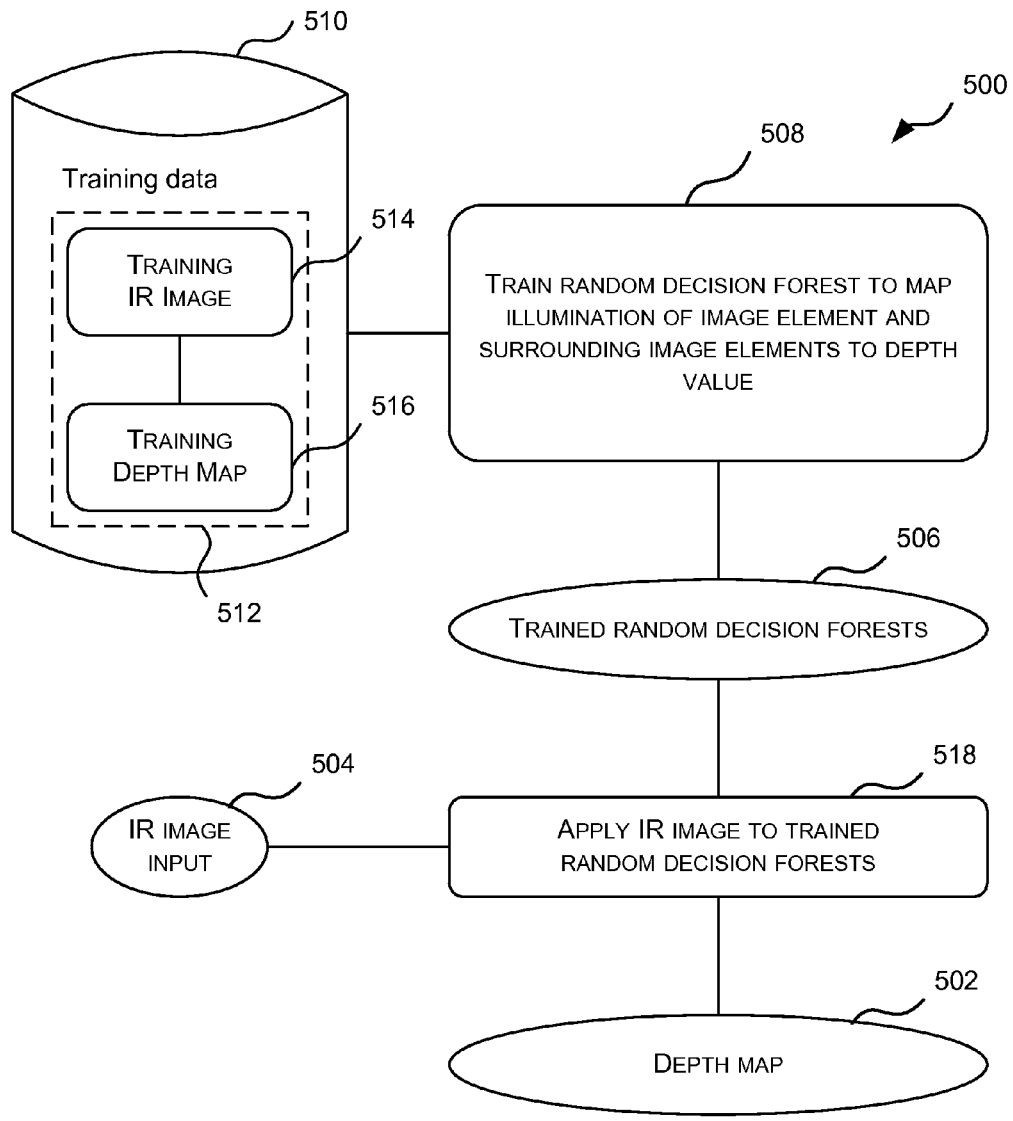
FIG. 5 is a schematic diagram of method of generating a depth map from an IR image using one or more random decision forests.

Reference is now made to FIG. 5 which illustrates an example method 500 for generating a depth map 502 from an IR image 504 wherein the trained machine learning component 404 comprises one or more trained random decision forests 506.

The random decision forests 506 are trained to map a given image element (e.g. pixel) in an IR image to an absolute depth value. As described above the depth value represents the distance between the surface represented by the image element and the IR camera 102.

The random decision forests 506 may be created and trained in an offline process 508 that receives as training data 510 pairs 512 of IR images 514 and corresponding depth maps 516. An example method for training a random decision forest 506 will be described with reference to FIG. 12. The random decision forests 506 may be stored at the computing-based device 104 or any other entity in the system or elsewhere in communication with the computing-based device 104.

Once the trained random decision forests 506 have been generated they can be applied 518 to an IR image 504 to produce a depth map 502. The trained random decision forests 506 generate a depth map in a fast, simple manner which is not computationally expensive and which may be performed in real time or near real time on a live video feed from the IR camera 102 of FIG. 1 even using conventional computing hardware in a single-threaded implementation or in parallel on, for example a mobile graphics processing unit (GPU).

Figure 6:
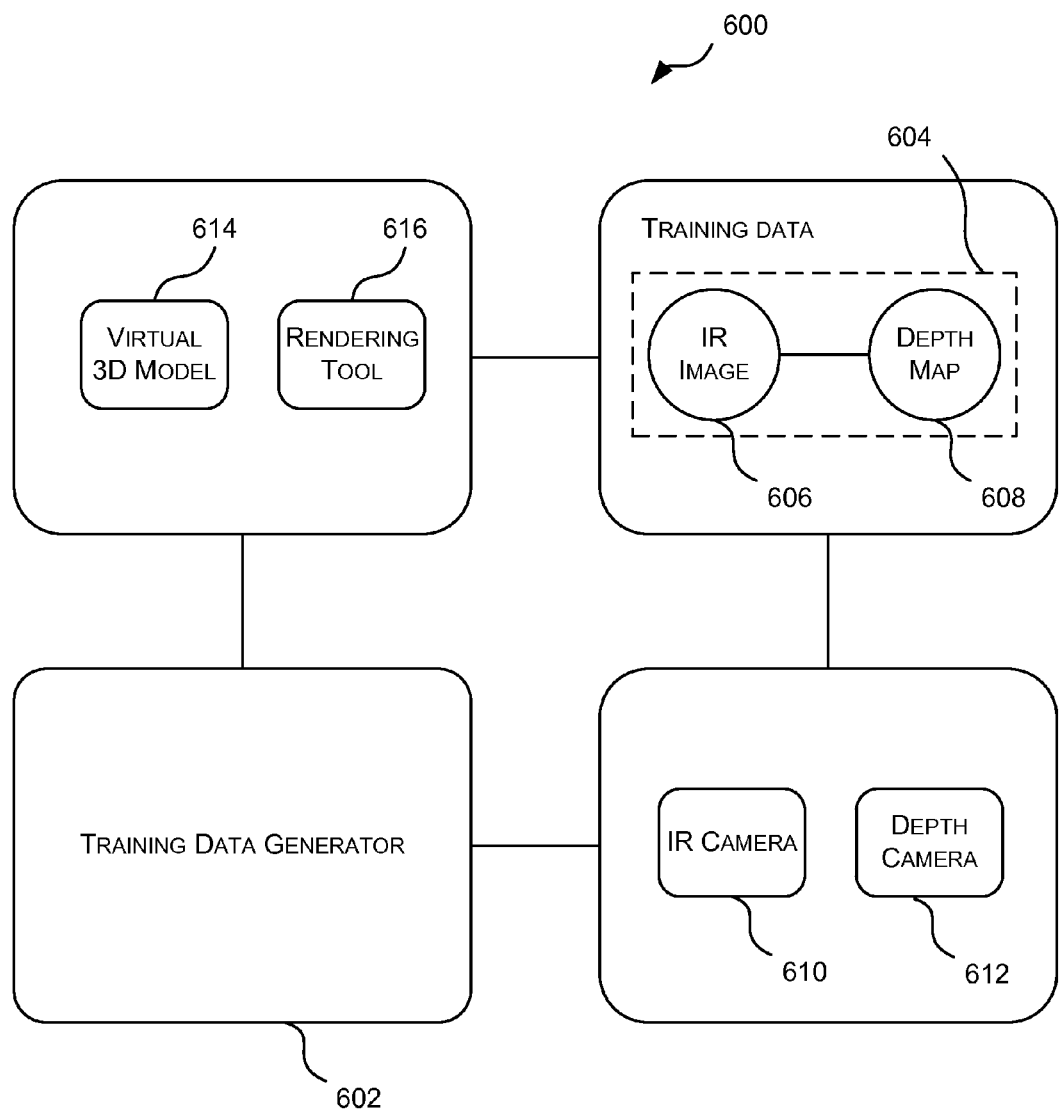
FIG. 6 is a schematic diagram of an apparatus for generating training data for a random decision forest.

Reference is now made to FIG. 6 which illustrates a process for generating the training data for the random decision forests. A training data generator 602, which is computer implemented, generates training data which comprises many pairs 604 of data, each pair 604 comprising an IR image 606 and a ground truth depth map 608 corresponding to the IR image 606 where each image element of the IR image 606 has an associated depth value in the depth map 608. The variety of objects in the training images and configuration and orientations of those objects is as wide as possible according to the application domain, storage and computing resources available.

The pairs of IR image and depth maps 604 may be generated from a real physical setup. In some cases, as shown in FIG. 6, the corresponding IR image and depth maps may be obtained from an IR camera 610 and a depth camera 612 that are mounted side by side so as to capture intensity (IR) and ground truth depth information simultaneously. In other cases, the corresponding IR images and depth maps may be obtained from a time-of-flight depth sensor that provides registered and synchronized infrared and depth images. In some cases the real infrared images are pre-processed by applying a fixed intensity threshold to segment objects (e.g. hand or face) from the background. This removes the need to train with varied backgrounds, reduces the compute load, and works well in modulo extreme ambient illumination.

The pairs of IR image and depth maps 604 may also, or alternatively, be synthetically generated using computer graphics techniques. For example, a computer system 602 may have access to a virtual 3D model 614 of an object and to a rendering tool 616. Using the virtual 3D model the rendering tool 616 may be arranged to automatically generate a plurality of high quality IR images and ground truth depth maps.

In some cases the computer system 602 may be used to simulate ambient lighting conditions to allow the system 100 to learn invariance to these conditions. The computer system 602 may also be used to simulate variations in the surface texture of the objects (e.g. hands and face) that are being rendered to allow the system 100 to learn invariance to different skin colors, wrinkles and/or facial hair.

The use of synthetic data allows very precise quantitative results, since synthetic images do not suffer from noise, unlike real data collected from a depth camera. The use of synthetic data allows other labels associated with depth image elements and images, which in turn provides training data for advanced applications such as pose tracking and gesture recognition.

Figure 7:
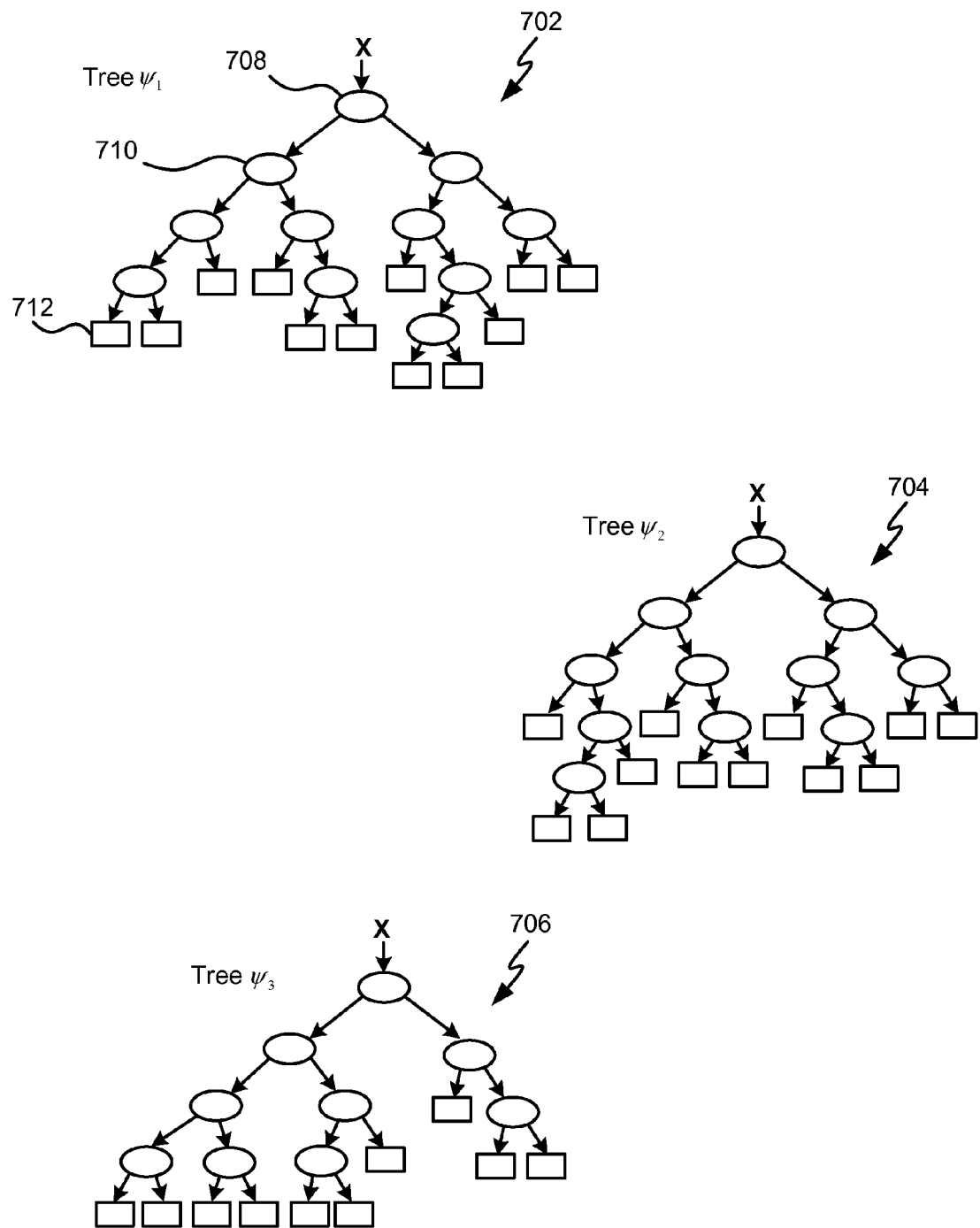
FIG. 7 is a schematic diagram of a random decision forest.

Reference is now made to FIG. 7 which is a schematic diagram of a random decision forest comprising three random decision trees 702, 704 and 706. Two or more random decision trees may be used. Three are shown in this example for clarity. A random decision tree is a type of data structure used to store data accumulated during a training phase so that it may be used to make predictions about examples previously unseen by the random decision tree. A random decision tree is usually used as part of an ensemble of random decision trees (referred to as a forest) trained for a particular application domain in order to achieve generalization (that is being able to make good predictions about examples which are unlike those used to train the forest). A random decision tree has a root node 708, a plurality of split nodes 710 and a plurality of leaf nodes 712. During training the structure of the tree (the number of nodes and how they are connected) is learned as well as split functions to be used at each of the split nodes. In addition, data is accumulated at the leaf nodes during training.

Image elements of an IR image may be pushed through trees of a random decision forest from the root to a leaf node in a process whereby a decision is made at each split node. The decision is made according to characteristics of the image element being classified and characteristics of image elements displaced from the original image element by spatial offsets specified by the parameters of the split node.

At a split node the data point proceeds to the next level of the tree down a branch chosen according to the results of the decision. During training, parameter values (also referred to as features) are learnt for use at the split nodes and data comprising part and state label votes are accumulated at the leaf nodes.

In various examples the machine learning component comprises one or more of the following to reduce the amount of memory required by the machine learning component: a random decision forest with merged nodes, a random decision forest with auto-context, an entangled random decision forest and a multi-layered decision forest. As is known to those of skill in the art an entangled random decision forest is a random decision forest where at least one decision tree has split nodes at a specified level which accumulate data during training which is issued to derive features for making decision at at least one lower level of the tree. A plurality of random decision forests have auto-context where output from one random decision forest is available to enable decisions to be made at split nodes in at least one other random decision forest. In a multi-layered random decision forests the output of one random decision forest is used to select subsequent random decision forests and/or outputs from subsequent random decision forests.

With respect to multi-layered decision forests, it has been determined the memory required for the machine learning component can be reduced or its accuracy can be increased by using a multi-layered decision tree. In particular, the problem can be significantly simplified by restricting the depths of the objects to a certain range. For such a constrained set, an expert forest can be trained to regress continuous and absolute depth values more efficiently. Accordingly, in some examples, the machine learning component comprises a two-layer decision tree where the first layer classifies the image element into one of a plurality of depth ranges or bins. In the second layer one or more expert regression decision forests which are trained specifically for the estimated depth range are applied to the image element. The results may then be aggregated to obtain a final estimation for the absolute depth of the image element.

Figure 8:
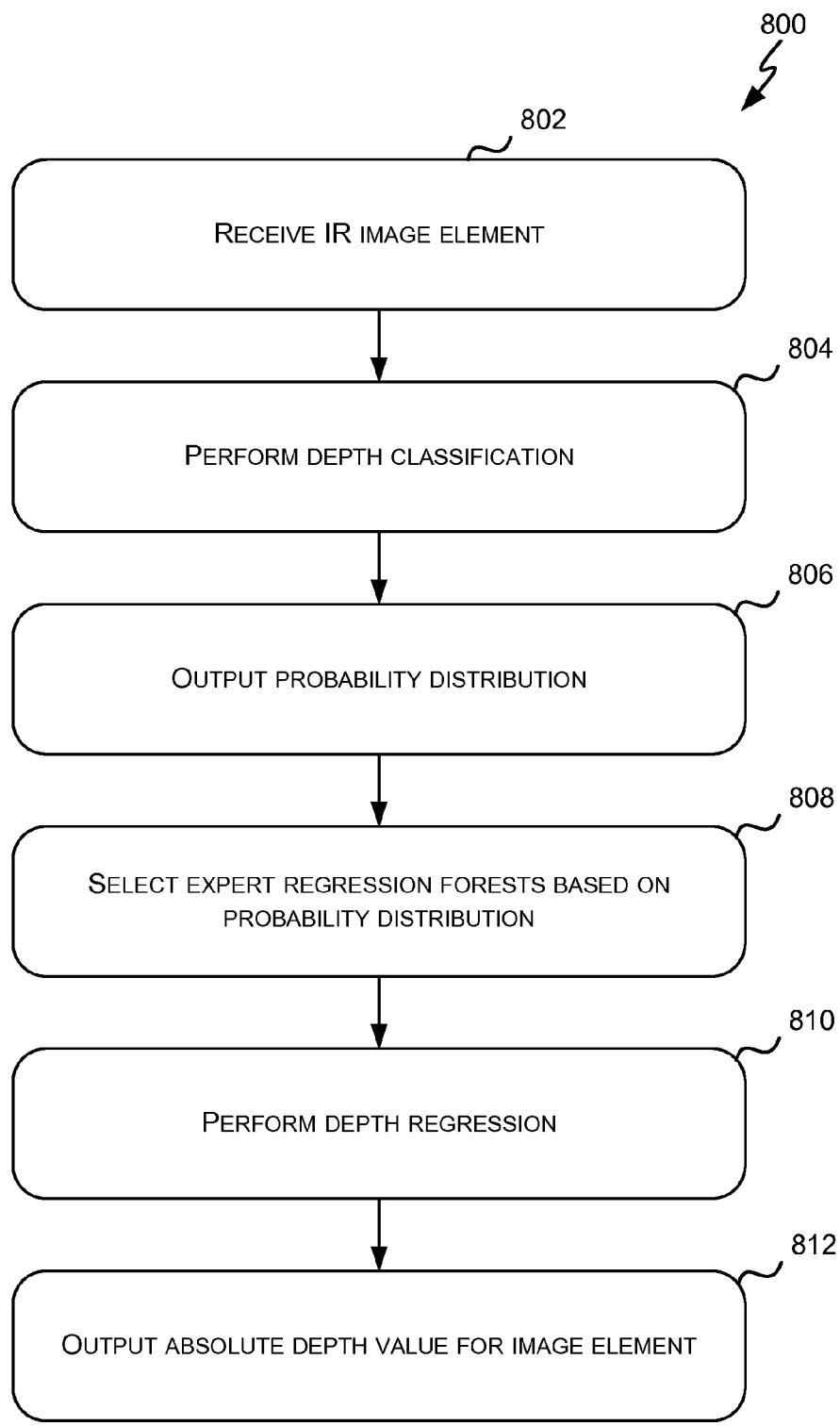
FIG. 8 is a flow diagram of generating a depth map from an IR image using a multi-layer decision forest.

Reference is now made to FIG. 8 which illustrates a method 800 for estimating the depth value for an IR image element using a multi-layered decision forest. At block 802 the depth estimation engine 212 receives an IR image element. Once the IR image element has been received the method 800 proceeds to block 804.

At block 804 the received IR image element is applied to a classification forest to classify the image element into one of a plurality of depth ranges or bins. In some examples, given an input image element x and infrared image I, the classification forest at the first layer infers a probability distribution p(c|x, I) over coarsely quantized depth ranges or bins indicated by c where $c \in \{1, \ldots, C\}$. The forest learns to map the image element and its spatial context (i.e. image elements surrounding the image element) into one of the depth bins for each image element. The number of depth ranges or bins C may be manually selected, for example, by experimenting on synthetic and/or real images. Once the image element has reached a leaf of the classification forest, the method proceeds to block 806.

At block 806 the classification forest output the probability distribution p which specifies the probability that the image element received in block 802 has a depth value within each of the depth ranges or bins. Once the probability distribution has been output the method proceeds to block 808.

At block 808 the expert regression forests for the second layer of the multi-layered decision forest method are selected. In some cases the expert forests for the second layer are chosen based on the local estimate of c (the estimate for the particular image element). This is referred to as the local expert network (LEN). In other cases the individual local posteriors p(c|x, I) are aggregated (and optionally averaged) over all the image elements to form a more robust estimate p(c|I) which is referred to as the global expert network (GEN). The expert forests are then selected based on the GEN. Once the expert regression forests have been selected, the method 800 proceeds to block 810.

At block 810 the received IR image element is applied to the expert regression forests selected at block 808. Specifically each selected expert regression forest is evaluated to form a set of absolute depth estimates. Once the image element has been pushed through the selected expert forests the method 800 proceeds to block 812.

At block 812 a depth value is assigned to the image element. In some cases the depth value y is a weighted sum over the estimates $y_c$ of the expert regression forests, where the weights $\omega_c$ are the posterior probabilities estimated in blocks 804 and 806 by the first layer. For example, the depth value may be calculated from formula (1) shown below.

$$y(x|I) = \sum_{c=1}^{C} \omega_c y_c(x|I) \tag{1}$$

Here $\omega_c$ can either be the local posterior p(c|x, I) in the case of LEN or the aggregated posterior p(c|I) in the case of GEN. GEN is typically more costly than LEN due to the extra pooling step after the first layer, but is generally more robust (i.e. it produces more consistently accurate results).

In some cases a threshold may be applied to the posteriors to select a subset of the expert regression trees instead of triggering all the expert regression trees. In other cases only k expert regression trees are selected where k is a fixed number. This may make GEN faster than LEN, if for example only k forests can fit into the cache at once since GEN evaluates the same forests for all the image elements, whereas LEN may choose a different set of k forests for each image element.

Using such a multi-layer decision forest may reduce the memory required to achieve a certain accuracy level over a single layer decision forest. In particular, by inferring potential useful intermediate variables the primary task is simplified which increases the accuracy or reduced memory consumption compared to a single-layer forest. For example, a multi-layered forest completes the same task as single-layered forest with C+1 forests instead of one where C is the number of depth ranges or bins. However, since the task is simplified for the second-layer or expert forests they are typically more shallow (i.e. have less levels) than a single-layered forest. The reduction in complexity typically more than compensates for the increase in the number of trees. For example, a classification tree of depth 22 and C=4 experts of depth 20 have the same size as a single tree of depth 24, but a single-layered forest may require a depth of 28 to have similar accuracy which is 16 times larger. This makes the multi-layer method quite suitable for devices, such as mobile phones, which have limited resources.

Figure 9:
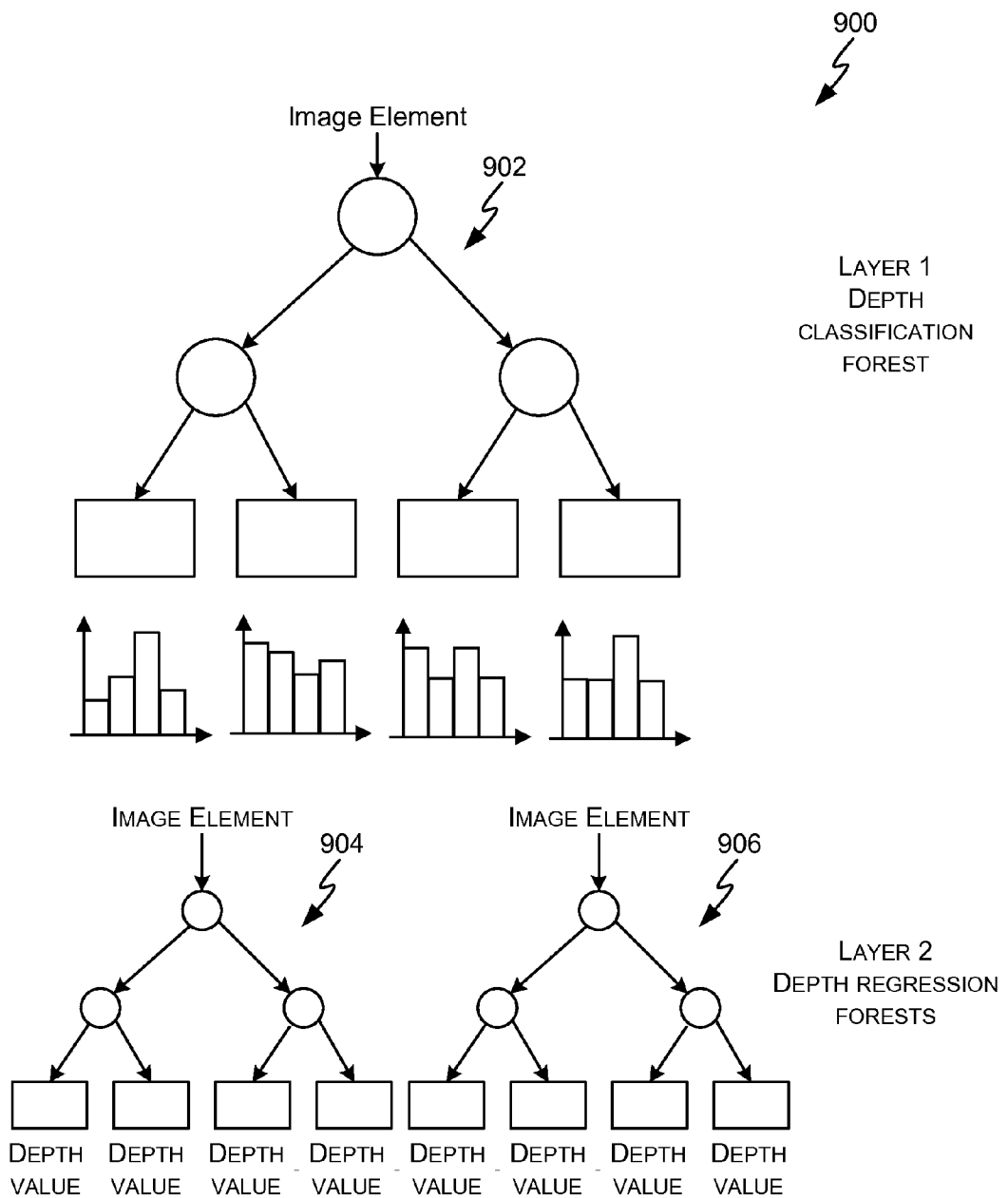
FIG. 9 is a schematic diagram of an example multi-layer decision forest.

Reference is now made to FIG. 9 which is a schematic diagram of an example multi-layer decision forest 900. The multi-layer forest comprises a first layer that has a single depth classification forest 902 and a second layer that has C depth regression forests 904, 906 where C is the number of depth ranges or bins.

The output of each leaf of the depth classification forest 902 is the local posterior p(c|x, I) which indicates the probability that the depth of the image element falls into each of the depth ranges or bins. For example, where C is four (i.e. there are four depth ranges or bins) the local posterior will have four values, one for each depth range or bin, indicating the likelihood that the depth of the image element falls in the associated depth range or bin. In some cases the local posterior may be represented by a histogram as shown in FIG. 9.

The output of each leaf of the depth regression forests 904, 906 is an absolute depth value. In some cases the depth value represents the depth in millimeters (mm). However, it will be evident to a person of skill in the art that the depth value may be represented in other measurement units.

Figure 10:
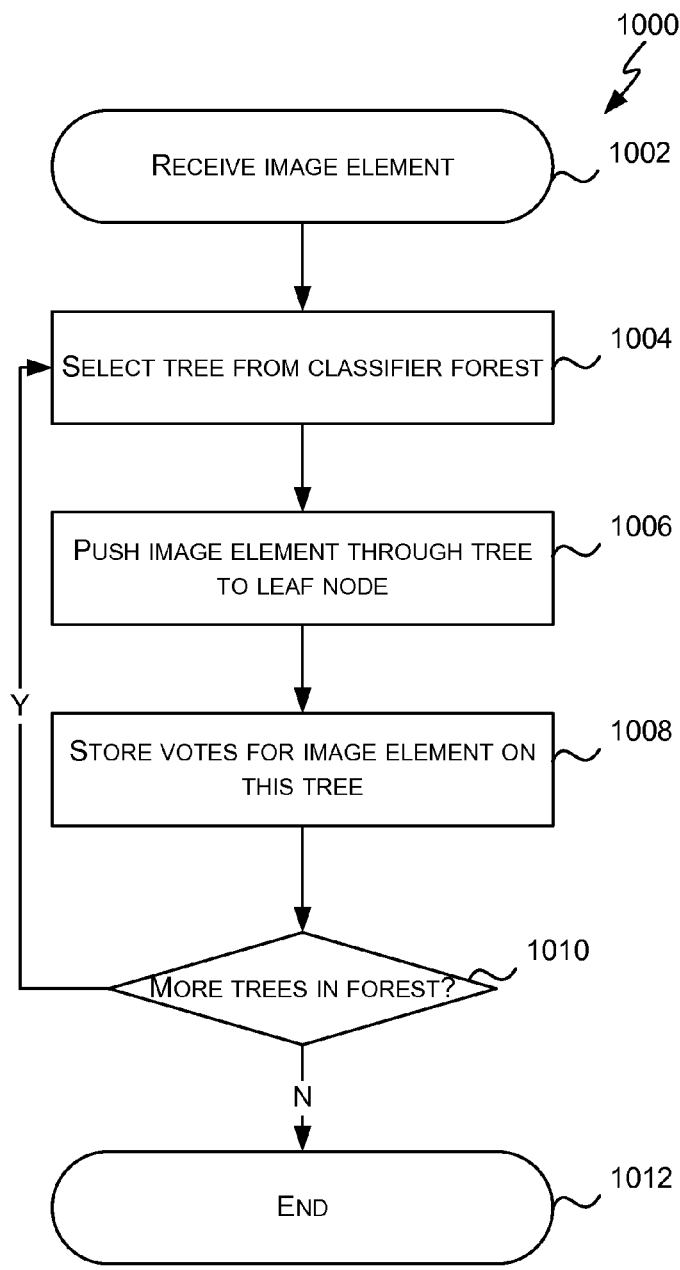
FIG. 10 is a flow diagram of a method of performing depth classification using a random decision forest.

Reference is now made to FIG. 10 which illustrates an example method 1000 for implementing the first layer of the multi-layer decision forest to classify an IR image element into one of a plurality of depth ranges or bins (e.g. block 804 of method 800). Although the method 1000 is described as being executed by the classifier engine 212 of FIG. 2, in other examples all or part of the method may be executed by another component of the system described herein.

At block 1002 the depth estimation engine 212 receives an image element to be classified. In some examples the depth estimation engine 212 may be configured to classify each image element in the IR image. In other examples the depth estimation engine 212 may be configured to classify only a subset of the image elements. In these examples, the depth estimation engine 212 may use a predetermined set of criteria for selecting the image elements to be classified. Once the depth estimation engine receives an image element to be classified the method 1000 proceeds to blocks 1004.

At block 1004, the depth estimation engine 214 selects a decision tree from the classifier decision forest. Once a decision tree has been selected, the method 1000 proceeds to block 1006.

At block 1006, the depth estimation engine 212 pushes the image element through the decision tree selected in block 1004, such that it is tested against the trained parameters at a node, and then passed to the appropriate child in dependence on the outcome of the test, and the process is repeated until the image element reaches a leaf node. Once the image element reaches a leaf node, the method 1000 proceeds to block 1008.

At block 1008, the classifier engine 214 stores the accumulated votes for each depth range or bin associated with the end leaf node. The votes may be in the form of a histogram or any other suitable form. Once the accumulated votes are stored the method 1000 proceeds to block 1010.

At block 1010, the depth estimation engine 212 determines whether there are more decision trees in the forest. If it is determined that there are more decision trees in the forest then the method 1000 proceeds back to block 1004 where another decision tree is selected. This is repeated until it has been performed for all the decision trees in the forest and then the method ends 1012.

In some cases the individual tree distributions are averaged together to form the forest output. In other cases the individual tree distributions may be combined in another suitable manner.

Note that the process for pushing an image element through the plurality of tress in the decision forest may be performed in parallel, instead of in sequence as shown in FIG. 10.

Figure 11:
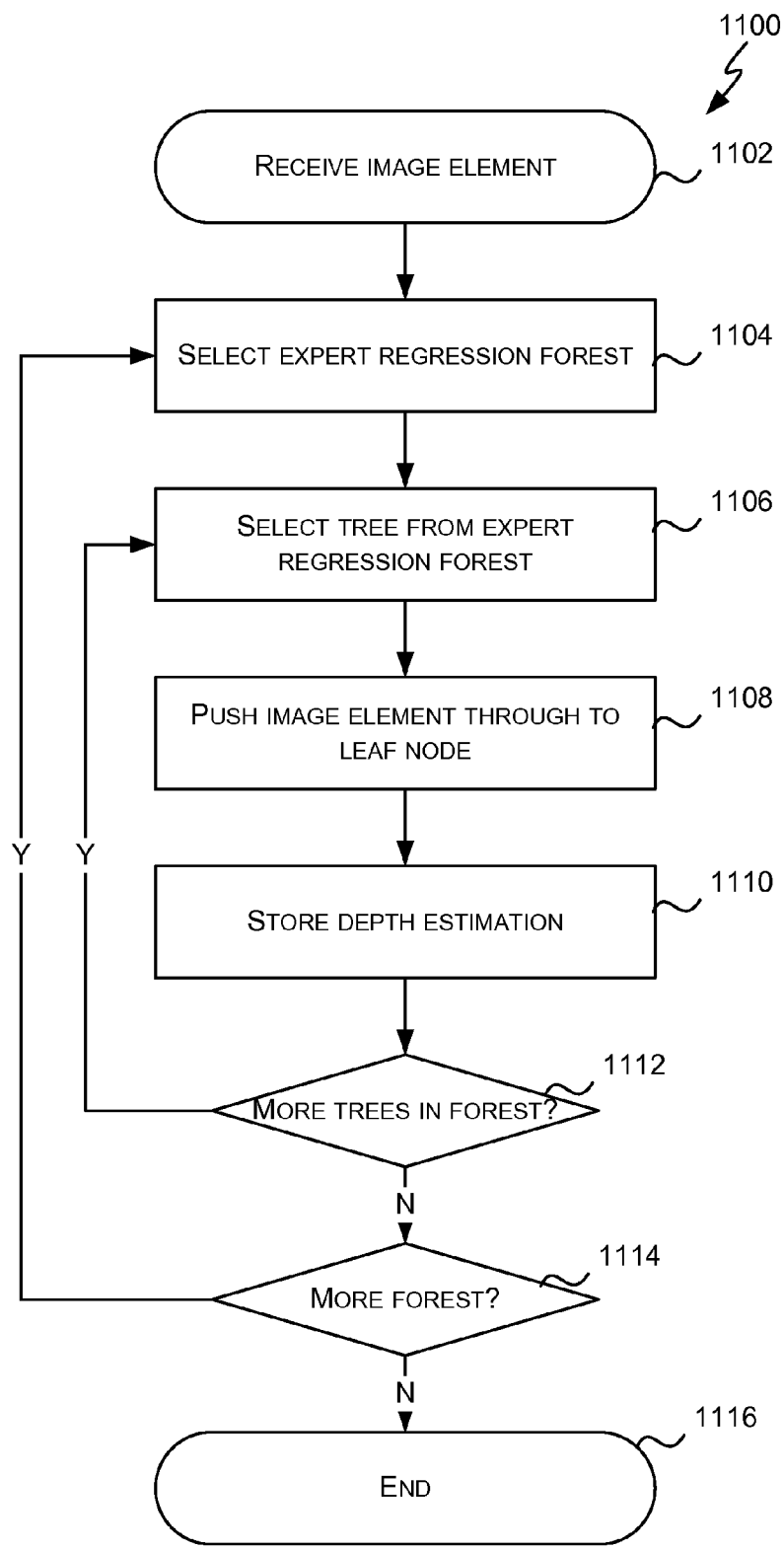
FIG. 11 is a flow diagram of a method of performing depth regression using a random decision forests.

Reference is now made to FIG. 11 which illustrates an example method 1100 for implementing the second layer of the multi-layer decision forest to determine the depth of an image element (e.g. block 810 of FIG. 8). Although the method 1100 is described as being executed by the classifier engine 212 of FIG. 2, in other examples all or part of the method may be executed by another component of the system described herein.

At block 1102 the depth estimation engine 212 receives an image element of an IR image. Once the depth estimation engine receives the image element the method 1100 proceeds to blocks 1104.

At block 1104, the depth estimation engine 212 selects an expert regression forest and at a block 1106, the depth estimation engine 212 selects a decision tree from the selected expert regression forest. Once a forest and tree have been selected, the method 1000 proceeds to block 1108.

At block 1108, the depth estimation engine 212 pushes the image element through the selected decision tree, such that it is tested against the trained parameters at a node, and then passed to the appropriate child in dependence on the outcome of the test, and the process repeated until the image element reaches a leaf node. Once the image element reaches a leaf node, the method 1100 proceeds to block 1110.

At block 1110, the classifier engine 214 stores the depth value y associated with the end leaf node. Once the depth value is stored the method 1100 proceeds to block 1112.

At block 1112, the depth estimation engine 212 determines whether there are more decision trees in the selected expert forest. If it is determined that there are more decision trees in the selected expert forest then the method 1100 proceeds back to block 1106 where another tree is selected. This is repeated until it has been performed for all the decision trees in the forest and then the method 1100 proceeds to block 1114.

At block 1114, the depth estimation engine 212 determines whether there are any more expert forests. If it is determined that there are more expert forests to be applied to the image element then the method proceeds back to block 1104. This is repeated until each decision forest has been applied to the image element and then the method 1100 ends at block 1116.

In some cases the mean individual tree depth value y is output for each tree. In other cases a small set $\{\hat{y}_c^1(x), \hat{y}_c^2(x), \ldots\}$ of multi-modal predictions about possible values of the depth for the image element. A median filter may then be applied over these predictions within a small patch around the image element x across all trees in the forest resulting in the final image element prediction. As described above, the image element predictions from each tree may be locally or globally weighted as described above.

Note that the process for pushing an image element through the plurality of trees in the decision forest may be performed in parallel, instead of in sequence as shown in FIG. 11. Similarly each forest may be evaluated in parallel instead of in sequence as shown in FIG. 11.

Figure 12:
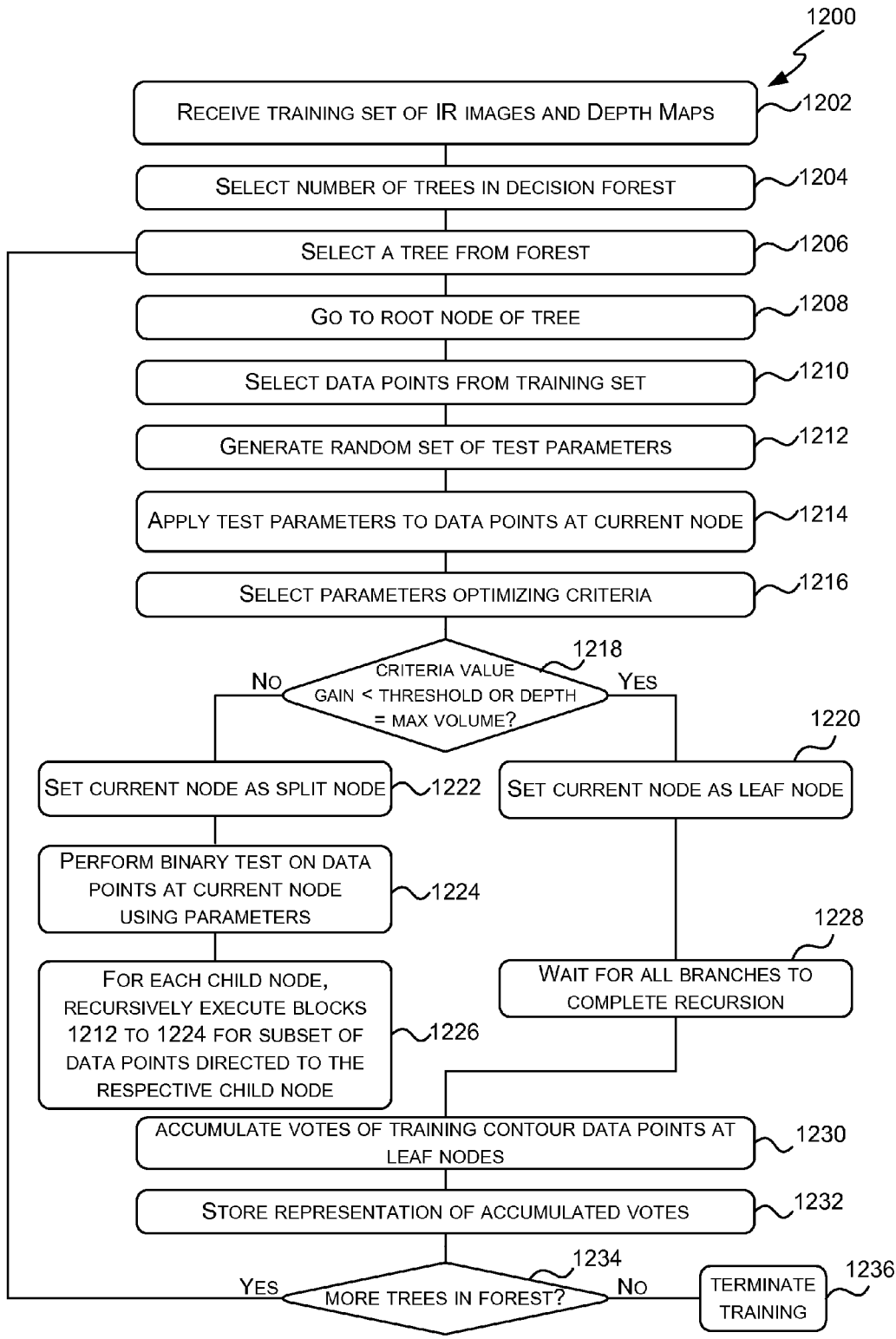
FIG. 12 is a flow diagram of a method of training a random decision forest.

Reference is now made to FIG. 12 which illustrates a flow chart of a method 1200 for training a multi-layer random decision forest to estimate the depth value for an IR image element. The random decision forest is trained using a set of training pairs of IR images and depth maps as described above with reference to FIG. 6.

At block 1202 the training set of pairs of IR images and depth maps as described above is received. Once the training data has been received, the method 1200 proceeds to block 1204.

At block 1204, the number of decision trees to be used in the random decision forest is selected. As described above a random decision forest is a collection of deterministic decision trees. Decision tress can suffer from over-fitting, i.e. poor generalization. However, an ensemble of many randomly trained decision trees (a random forest) yields improved generalization. Each tree of the forest is trained. During the training process the number of trees is fixed. Once the number of decision trees has been selected, the method 1200 proceeds to block 1206.

At block 1206, a tree from the forest is selected for training. Once a tree has been selected for training, the method 1200 proceeds to block 1208.

At block 1208, the root node of the tree selected in block 1206 is selected. Once the root node has been selected, the method 1200 proceeds to block 1210.

At block 1210, at least a subset of the image elements from each pair of IR image and depth map is selected for training the tree. Once the image elements from the training pairs to be used for training have been selected, the method 1200 proceeds to block 1212.

At block 1212, a random set of test parameters are then used for the binary test performed at the root node as candidate features. In operation, each root and split node of each tree performs a binary test on the input data and based on the results directs the data to the left (L) or right (R) child node. The leaf nodes do not perform any action; they store probability distributions or depth values depending on whether they are part of a depth classifier forest or a depth regression forest.

In one example the binary test performed at the root node is of the form shown in equation (2).

$$f(F) < T \qquad (2)$$

Specifically, a function $f(F)$ evaluates a feature F of an image element x to determine if it is greater than a threshold value T. If the function is greater than the threshold value then the result of the binary test is true. Otherwise the result of the binary test is false.

It will be evident to a person of skill in the art that the binary test of equation (2) is an example only and other suitable binary tests may be used. In particular, in another example, the binary test performed at the root node may evaluate the function to determine if it is greater than a first threshold value T and less than a second threshold value τ.

A candidate function $f(F)$ can only make use of image element information which is available at test time. The parameter F for the function $f(F)$ is randomly generated during training. The process for generating the parameter F can comprise generating random spatial offset values in the form of a two dimensional displacement. The result of the function $f(F)$ is then computed by observing an image element value for a test data point which is displaced from the data point of interest x in the IR image by the spatial offset.

For example, the function shown in equation (3) may be used as the basis of the binary test where φ is as shown in equation (4)

$$f(x; \theta) = \begin{cases} L & \text{if } \phi(x; u, v) < T \\ R & \text{otherwise} \end{cases} \quad (3)$$

$$\phi(x; u, v) = I(x + u) - I(x + v) \quad (4)$$

where I is the input infrared image and u and v are 2D image element offsets.

Figure 13:
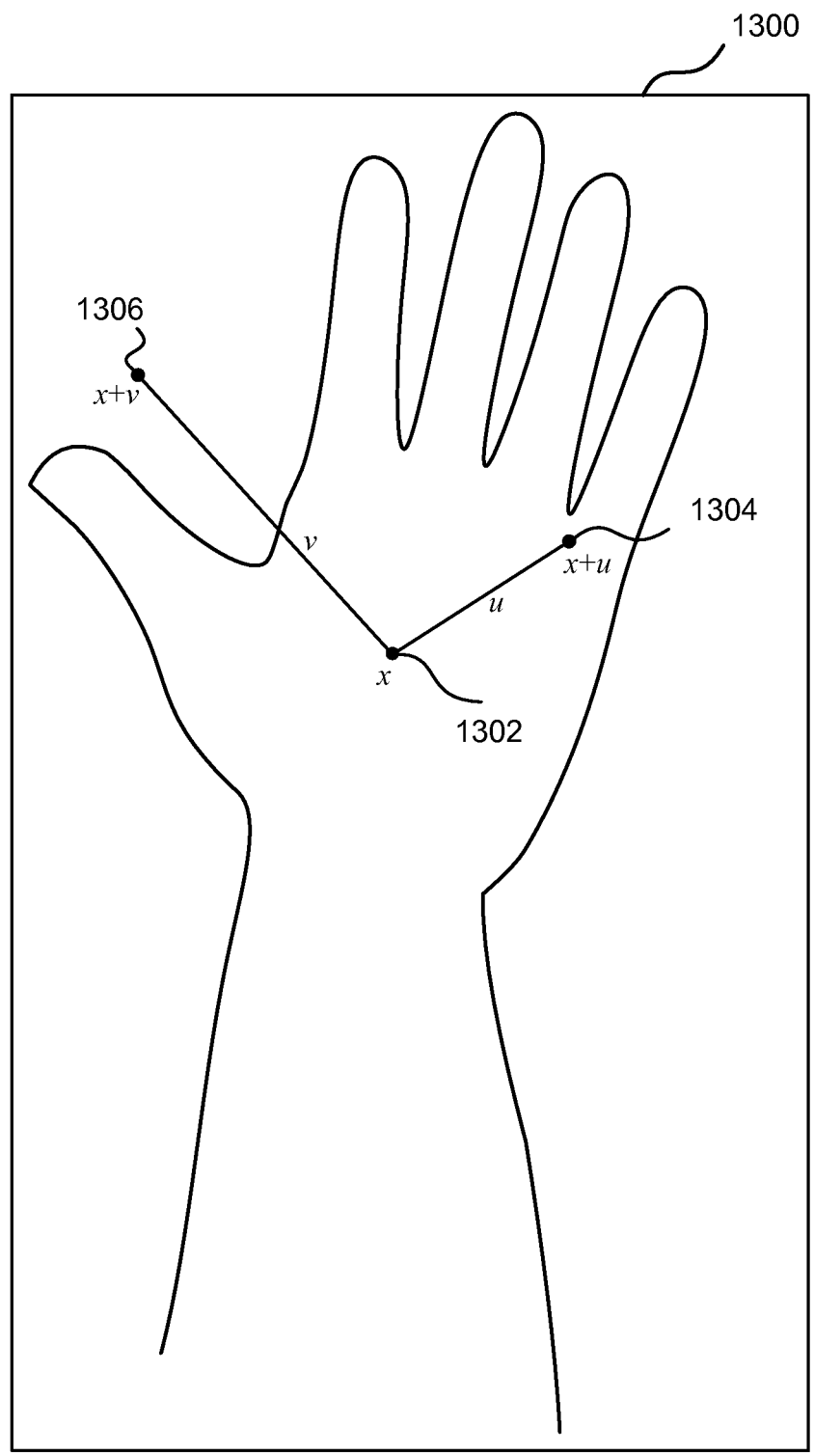
FIG. 13 is a schematic diagram of a reference image element and two probe image elements.

This function determines the difference in intensity between two image elements spatially offset from the image element of interest x by offsets u and v respectively. The image element of interest x will be referred to as the reference image element and the spatially offset image elements (x+u) and (x+v) will be referred to as probe image elements. An example of a reference image element x 1302 in an IR image 1300 and its probe image elements 1304 and 1306 are illustrated in FIG. 13. The offsets u and v can be quite large (up to +/−128 pixels in a 640×480 image) and allow the forests to learn about the spatial context in the image.

In some cases the IR image is pre-processed to compute a pseudo depth map D' using the inverse square law. For example, in some cases the pseudo depth for image element x may be calculated using equation (5):

$$D'(x) = \sqrt{\frac{1}{I(x)}} \quad (5)$$

The features may then be selected based on the pseudo depth map D' rather than (or in addition to) the raw IR image.

The random set of test parameters comprises a plurality of random values for the function parameter F and the threshold value T. For example, where the function of equation (3) is used, a plurality of random values for u, v, and T are generated.

In order to inject randomness into the decision trees, the function parameters F of each split node are optimized only over a randomly sampled subset of all possible parameters. This is an effective and simple way of injecting randomness into the trees, and increases generalization.

Once the test parameters have been selected, the method 1200 proceeds to block 1214.

At block 1214, every combination of test parameters is applied to each data point selected for training. In other words, available values for F (i.e. u, v) in combination with available values of T for each image element selected for training. Once the combinations of test parameters are applied to the training image elements, the method 1200 proceeds to block 1216.

At block 1216, optimizing criteria are calculated for each combination of test parameters. In an example, the calculated criteria comprise the information gain (also known as the relative entropy) of the histogram for the depth bins or the density of the depth values. Where the test function of equation (3) is used, the gain Q of a particular combination of test parameters may be calculated using equation (6) where θ is as set out in equation (7):

$$Q(\theta) = E(S) - \sum_{s \in \{L,R\}} \frac{|S_d(\theta)|}{|S|} E(S_d(\theta)) \quad (6)$$

$$\theta = (u, v, T) \quad (7)$$

where S is the sample set (the subset of training data used to train the tree), and $S_L$ and $S_R$ are the two sets of examples formed by the split.

For a tree in the first layer (i.e. classification tree), E(S) is the Shannon entropy of the empirical distribution of the quantized depth labels c in S as shown in equations (8) and (9):

$$E(S) = -\sum_{c=1}^{C} p(c \mid S) \log p(c \mid S), \text{ with} \quad (8)$$

$$p(c \mid S) = \frac{1}{|S|} \sum_{(.,.,c') \in S} [c = c'] \quad (9)$$

For a tree in the second layer (i.e. regression tree), E(S) is the differential entropy of the empirical continuous density p(y|S) where y is the image element x's ground truth depth label and p(y|S) is modeled as a one-dimensional Gaussian. Computing the mean $\mu_s$ and variance $\sigma_s^2$ in the standard way from the samples (y)∈S the continuous entropy reduces to that shown in equation (9):

$$E(S) = \log(\sigma_s) \quad (9)$$

Other criteria that may be used to assess the quality of the parameters include, but is not limited to, Gini entropy or the 'two-ing' criterion. The parameters that maximized the criteria (e.g. gain) is selected and stored at the current node for future use. Once a parameter set has been selected, the method 1200 proceeds to block 1218.

At block 1218, it is determined whether the value for the calculated criteria (e.g. gain) is less than (or greater than) a threshold. If the value for the criteria is less than the threshold, then this indicates that further expansion of the tree does not provide significant benefit. This gives rise to asymmetrical trees which naturally stop growing when no further nodes are beneficial. In such cases, the method 1200 proceeds to block 1220 where the current node is set as a leaf node. Similarly, the current depth of the trees is determined (i.e. how many levels of nodes are between the root node and the current node). If this is greater than a predefined maximum value, then the method 1200 proceeds to block 1220 where the current node is set as a leaf node. Once the current node is set to the leaf node, the method 1200 proceeds to block 1228.

If the value for the calculated criteria (e.g. gain) is greater than or equal to the threshold, and the tree depth is less than the maximum value, then the method 1200 proceeds to block 1222 where the current node is set to a split node. Once the current node is set to a split node the method 1200 moves to block 1224.

At block 1224, the subset of data points sent to each child node of the split nodes is determined using the parameters that optimized the criteria (e.g. gain). Specifically, these parameters are used in the binary test and the binary test is performed on all the training data points. The data points that pass the binary test form a first subset sent to a first child node, and the data points that fail the binary test form a second subset sent to a second child node. Once the subsets of data points have been determined, the method 1200 proceeds to block 1226.

At block 1226, for each of the child nodes, the process outlined in blocks 1212 to 1224 is recursively executed for the subset of data points directed to the respective child node. In other words, for each child node, new random test parameters are generated, applied to the respective subset of data points, parameters optimizing the criteria selected and the type of node (split or leaf) is determined. Therefore, this process recursively moves through the tree, training each node until leaf nodes are reached at each branch.

At block 1228, it is determined whether all nodes in all branches have been trained. Once all nodes in all branches have been trained, the method 1200 proceeds to block 1230.

At block 1230, votes may be accumulated at the leaf nodes of the trees. This is the training stage and so particular image elements which reach a given leaf node have depth values known from the ground truth training data. Once the votes are accumulated, the method 1200 proceeds to block 1232.

At block 1232, a representation of the accumulated votes may be stored using various different methods. Once the accumulated votes have been stored, the method 1200 proceeds to block 1234.

At block 1234, it is determined whether more trees are present in the decision forest. If so, then the method 1200 proceeds to block 1206 where the next tree in the decision forest is selected and the process repeats. If all the trees in the forest have been trained, and no others remain, then the training process is complete and the method 1200 terminates at block 1236.

Figure 14:
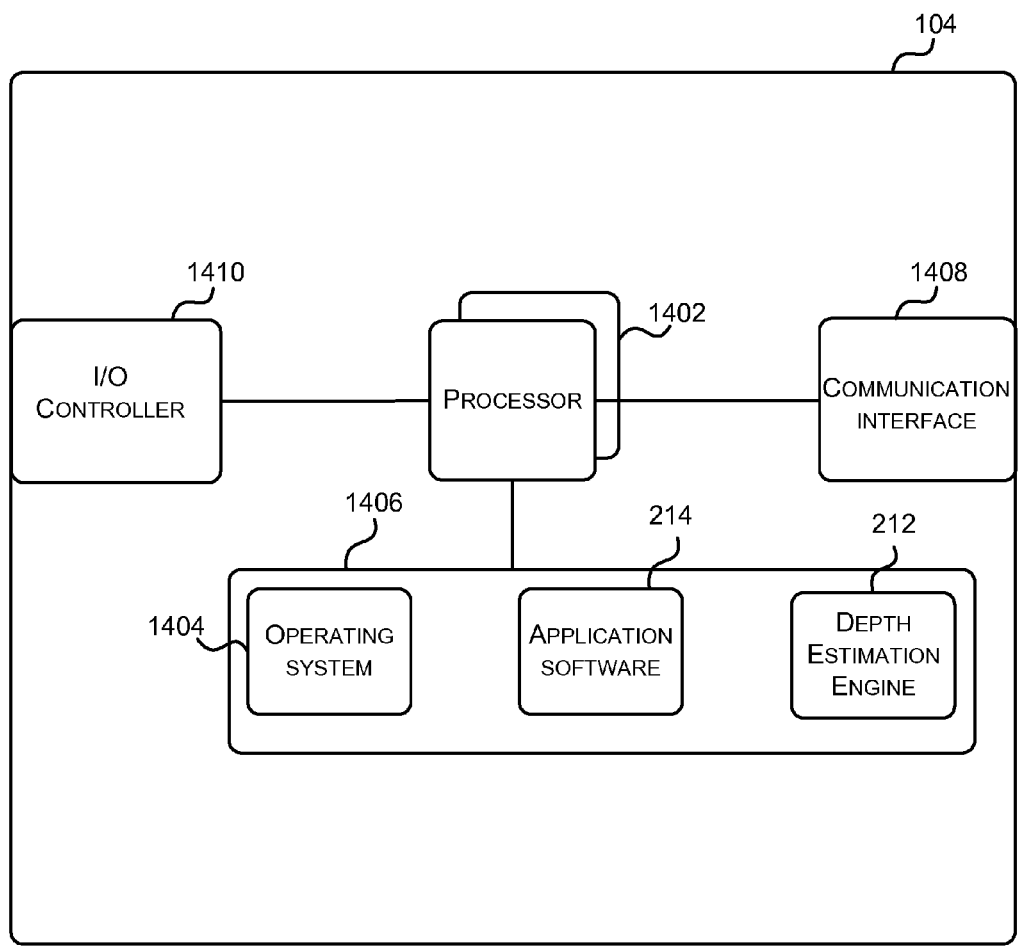
FIG. 14 illustrates an exemplary computing-based device in which embodiments of the systems and methods described herein may be implemented.

FIG. 14 illustrates various components of an exemplary computing-based device 104 which may be implemented as any form of a computing and/or electronic device, and in which embodiments of the systems and methods described herein may be implemented.

Computing-based device 104 comprises one or more processors 1402 which may be microprocessors, controllers or any other suitable type of processors for processing computer executable instructions to control the operation of the device in order to classify objects in image. In some examples, for example where a system on a chip architecture is used, the processors 1402 may include one or more fixed function blocks (also referred to as accelerators) which implement a part of the method of controlling the computing-based device in hardware (rather than software or firmware). Platform software comprising an operating system 1404 or any other suitable platform software may be provided at the computing-based device to enable application software 214 to be executed on the device.

The computer executable instructions may be provided using any computer-readable media that is accessible by computing based device 104. Computer-readable media may include, for example, computer storage media such as memory 1406 and communications media. Computer storage media, such as memory 1406, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing-based device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 1406) is shown within the computing-based device 104 it will be appreciated that the storage may be distributed or located remotely and accessed via a network or other communication link (e.g. using communication interface 1408).

The computing-based device 104 also comprises an input/output controller 1410 arranged to output display information to a display device 108 (FIG. 1) which may be separate from or integral to the computing-based device 108. The display information may provide a graphical user interface. The input/output controller 1410 is also arranged to receive and process input from one or more devices, such as a user input device (e.g. a mouse, keyboard, camera, microphone or other sensor). In some examples the user input device may detect voice input, user gestures or other user actions and may provide a natural user interface (NUI). In an embodiment the display device 108 may also act as the user input device if it is a touch sensitive display device. The input/output controller 1410 may also output data to devices other than the display device, e.g. a locally connected printing device (not shown in FIG. 14).

The input/output controller 1410, display device 108 and optionally the user input device (not shown) may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, RGB camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs).

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A computer-implemented method of image processing comprising:
   receiving, at a processor, data representing at least one infrared image from an infrared camera, the image being of a scene actively illuminated with diffuse infrared illumination, the scene comprising a plurality of surfaces;
   applying, by the processor, at least a portion of the data representing at least one infrared image to a trained machine learning component;
   receiving as output from the trained machine learning component, a depth map comprising, for individual image elements of the infrared image, distance from the infrared camera to the surfaces in the scene depicted by the individual image elements; and
   at least one of:
      wherein the trained machine learning component was trained using pairs of infrared images and corresponding ground truth depth maps; or
      wherein the trained machine learning component comprises at least one random decision forest and the method further comprising reducing the size of the trained machine learning component by using at least one random decision forest with one or more of: merged nodes, auto-context, entanglement, and a classification layer used to direct input between a plurality of expert forests.

2. The method of claim 1, wherein the trained machine learning component was trained using pairs of infrared images and corresponding ground truth depth maps.

3. The method of claim 1, wherein the trained machine learning component is operable to calculate a depth map from a single IR image.

4. The method of claim 1, wherein the trained machine learning component has been trained using pairs of infrared images and corresponding depth maps, the depth maps being empirically observed using a depth camera.

5. The method of claim 1, wherein the trained machine learning component has been trained using pairs of synthetically generated infrared images and corresponding synthetically generated depth maps.

6. The method of claim 1, further comprising, receiving, at the processor, a stream of infrared images from the infrared camera at a frame rate of the infrared camera; and using the trained machine learning component to calculate a stream of depth maps from the stream of infrared images, at least at the frame rate of the infrared camera.

7. The method of claim 1, further comprising applying, by the processor, at least a portion of the data representing at least one image to the trained machine learning component by sending the at least portion of the data representing at least one image to the trained machine learning component at a remote entity.

8. The method of claim 1, further comprising applying, by the processor, at least a portion of the data representing at least one image to the trained machine learning component at a hand held computing device comprising the infrared camera.

9. The method of claim 1, wherein a depth map is computed without a temporal sequence of a plurality of the infrared images.

10. The method of claim 1, wherein a depth map is computed without a depth camera.

11. The method of claim 1, wherein the trained machine learning component comprises at least one random decision forest.

12. The method of claim 11, further comprising computing features at split nodes of the random decision forest, the features comprising comparisons between reference image elements and probe image elements.

13. The method of claim 11, further comprising reducing the size of the trained machine learning component by using at least one random decision forest with one or more of: merged nodes, auto-context, entanglement, and a classification layer used to direct input between a plurality of expert forests.

14. The method of claim 1, further comprising storing the trained machine learning component in a hand held computing device.

15. The method of claim 1, wherein the trained machine learning component is arranged to classify the surfaces depicted in the infrared image into one of a plurality of depth bins, a depth bin being a range of distances from the camera.

16. The method of claim 15, wherein the trained machine learning component comprises a plurality of random decision forests, individual ones of the plurality of random decision forests having been trained according to corresponding individual ones of the plurality of depth bins.

17. The method of claim 1, further comprising using the depth map in at least one of: video compression, segmentation for background removal, gesture recognition, natural user interface, surface reconstruction and object scanning.

18. A system to process an image, the system comprising a computing-based device configured to:
receive data representing at least one infrared image from an infrared camera, the image being of a scene actively illuminated with diffuse infrared illumination, the scene comprising a plurality of surfaces;
apply the data representing at least one infrared image to a trained machine learning component;
receive as output from the trained machine learning component, a depth map comprising, for individual image elements of the infrared image, distance from the infrared camera to the surfaces in the scene depicted by the individual image elements; and
at least one of:
wherein the trained machine learning component was trained using pairs of infrared images and corresponding ground truth depth maps; or
wherein the trained machine learning component comprises at least one random decision forest and the system being configured to reduce the size of the trained machine learning component by using at least one random decision forest with one or more of: merged nodes, auto-context, entanglement, and a classification layer used to direct input between a plurality of expert forests.

19. The system according to claim 18, the computing-based device being at least partially implemented using hardware logic selected from any one of more of: a field-programmable gate array, a program-specific integrated circuit, a program-specific standard product, a system-on-a-chip, a complex programmable logic device.

20. A computer-implemented method of image processing comprising:
receiving, at a processor, data representing at least one infrared image from an infrared camera, the image being of a scene actively illuminated with diffuse infrared illumination, the scene comprising a plurality of surfaces;
applying, by the processor, at least a portion of the data representing at least one infrared image to a trained machine learning component, the trained machine learning component comprising one or more random decision forests trained to classify the surfaces depicted in the infrared image into one of a plurality of depth bins, a depth bin being a range of distances from the camera;
receiving as output from the trained machine learning component, a depth map comprising, for individual image elements of the infrared image, distance from the infrared camera to the surfaces in the scene depicted by the individual image elements; and
at least one of:
wherein the trained machine learning component was trained using pairs of infrared images and corresponding ground truth depth maps; or
wherein the trained machine learning component comprises at least one random decision forest and the method further comprising reducing the size of the trained machine learning component by using at least one random decision forest with one or more of: merged nodes, auto-context, entanglement, and a classification layer used to direct input between a plurality of expert forests.

* * * * *